Figure 1:
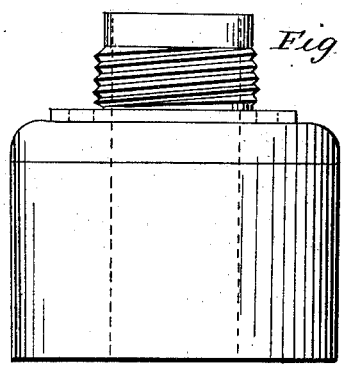

G. W. MARTIN.
Making Rubber Articles.

No. 80,299.  
Patented July 28, 1868.

Witnesses:  
Louis Mackay  
P. F. Larner

Inventor:  
G. W. Martin  
by Wiedersheim & Co.  
attys.

United States Patent Office.

GEORGE W. MARTIN, OF BOSTON, MASSACHUSETTS, ASSIGNOR TO HIMSELF AND J. W. HASKINS, OF SAME PLACE.

Letters Patent No. 80,299, dated July 28, 1868.

IMPROVEMENT IN THE MANUFACTURE OF ARTICLES OF SOFT RUBBER.

The Schedule referred to in these Letters Patent and making part of the same.

TO ALL WHOM IT MAY CONCERN:

Be it known that I, GEORGE W. MARTIN, of Boston, in the county of Suffolk, and State of Massachusetts, have invented a new and useful Improvement in the Manufacture of Articles in Rubber; and I do hereby declare the following to be a full, clear, and exact description of the same, reference being had to the accompanying drawings, which are made part of this specification.

I have discovered that elastic screw-threads may be produced by subjecting soft rubber to a process of heating, moulding, and pressing.

I thus produce elastic screw-threads, the chief purpose of which is to secure a joint which shall be effective in preventing the passage through it of air, steam, gas, or liquid. Thus the elastic threads may be applied to a rubber coupling for metallic tubing, or to rubber tubing having a metallic coupling.

The elastic threads are especially applicable to caps and stoppers for jars, cans, and bottles, but the invention is not confined to such uses, as it will be found useful as applied to bolts and nuts, and, in fact, in a great variety of instances, where screw-threads are formed upon metal, wood, &c.

A joint formed wholly or partially of elastic screw-threads is advantageous on account of tightness, freedom from rust, flexibility, lightness, and that quality of rubber which prevents the threads from being crushed or torn off by forcible friction.

In the drawings—

Figure 5:
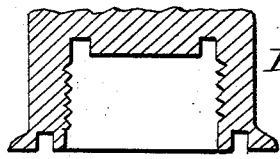

Figure 1 may represent an inkstand or fruit-jar with the threads upon its neck, and Figure 5 is a correspondingly-threaded cap adapted thereto.

Figure 2:
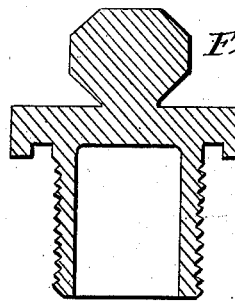

Figure 2 may represent a bottle-stopper of elastic rubber, whose internal chamber may be filled with a core of some suitable hard substance.

Figure 3:
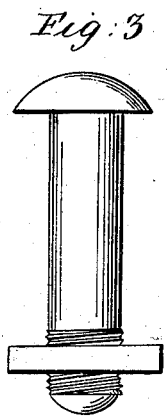

Figure 3 a bolt, with a nut having elastic screw-threads, and

Figure 4:

Figure 4, two pipe-sections and a coupling illustrating the invention.

The elastic threads may be formed with and upon articles of rubber, but they may be formed separately, and afterwards applied to articles of metal, wood, or other hard material.

Having thus described my invention, what I claim as new herein, and desire to secure by Letters Patent, is—

An elastic screw-thread, substantially as described.

To the above I have signed my name, this 2d day of June, 1868.

GEO. W. MARTIN.

Witnesses:
JOHN A. WIEDERSHEIM,
JACOB HENRY.